(12) United States Patent
Robideaux (10) Patent No.: US 12,003,818 B2
(45) Date of Patent: Jun. 4, 2024

(54) SYSTEMS AND METHODS FOR PROVIDING BINGE-WATCHING RECOMMENDATIONS

(71) Applicant: Rovi Guides, Inc., San Jose, CA (US)

(72) Inventor: Daniel Robideaux, Morgan Hill, CA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 16/696,613

(22) Filed: Nov. 26, 2019

(65) Prior Publication Data

US 2021/0160574 A1 May 27, 2021

(51) Int. Cl.
*H04N 21/466* (2011.01)
*H04N 21/442* (2011.01)
*H04N 21/45* (2011.01)

(52) U.S. Cl.
CPC ... *H04N 21/4668* (2013.01); *H04N 21/44222* (2013.01); *H04N 21/4532* (2013.01); *H04N 21/4667* (2013.01)

(58) Field of Classification Search
CPC ......... H04N 21/4668; H04N 21/44222; H04N 21/4532; H04N 21/4667
USPC .......................................................... 725/14
See application file for complete search history.

(56) References Cited

U.S. PATENT DOCUMENTS

| | | | |
|---|---|---|---|
| 7,761,892 B2 | 7/2010 | Ellis | |
| 8,046,801 B2 | 10/2011 | Ellis | |
| 8,554,640 B1* | 10/2013 | Dykstra | G06Q 10/101 705/26.7 |
| 10,341,703 B1* | 7/2019 | Shen | G06Q 30/01 |
| 2005/0251827 A1 | 7/2005 | Ellis | |
| 2006/0282856 A1* | 12/2006 | Errico | H04N 21/4667 348/E7.071 |
| 2009/0019488 A1* | 1/2009 | Ruiz-Velasco | H04N 21/25891 725/43 |
| 2009/0060468 A1* | 3/2009 | Carlberg | H04N 21/25883 386/297 |
| 2010/0094866 A1* | 4/2010 | Cuttner | G06F 16/735 707/723 |
| 2010/0138865 A1* | 6/2010 | Rai | H04N 21/482 725/44 |
| 2014/0325552 A1* | 10/2014 | Evans | H04N 21/2668 725/28 |
| 2015/0312609 A1* | 10/2015 | Hoctor | H04N 21/8133 725/14 |
| 2015/0350709 A1* | 12/2015 | Tomita | G06Q 10/02 725/32 |

(Continued)

OTHER PUBLICATIONS

Vasileva, Konstantina, How Netflix uses data to keep you bingewatching & personalize your viewing experience, Dec. 9, 2017, The Data Nudge (found at https://medium.com/the-data-nudge), p. 1-9 (Year: 2017).*

(Continued)

*Primary Examiner* — Alfonso Castro
(74) *Attorney, Agent, or Firm* — HALEY GUILIANO LLP (57) ABSTRACT

Systems and methods are provided for generating and presenting content series recommendations to a particular user that has just completed binge-watching a particular content series. The recommendations are based on content series consumed by other users who have also consumed the content series just completed by the user and that share behavioral attributes to that of the user.

15 Claims, 5 Drawing Sheets

(56) References Cited

U.S. PATENT DOCUMENTS

2015/0365729 A1* 12/2015 Kaya ................ H04N 21/4826
　　　　　　　　　　　　　　　　　　　725/14
2016/0142783 A1　　5/2016 Bagga et al.
2016/0165298 A1* 6/2016 Sapunova ............ H04N 21/251
　　　　　　　　　　　　　　　　　　　725/14
2016/0300266 A1* 10/2016 Smalley ................ H04W 4/029
2017/0055040 A1* 2/2017 Volkman ............ H04N 21/4314
2017/0195731 A1　　7/2017 Girlando et al.
2020/0226493 A1* 7/2020 Hari Haran ............ G06N 20/00

OTHER PUBLICATIONS

PCT International Search Report for International Application No. PCT/US2020/062341, dated Mar. 2, 2021 (14 Page).

* cited by examiner

SYSTEMS AND METHODS FOR PROVIDING BINGE-WATCHING RECOMMENDATIONS

The present disclosure is directed towards analyzing users' behavioral attributes in connection with consumption of series content for recommending content for binge-watching.

BACKGROUND

Content recommendation has conventionally relied on determining user preferences and analyzing metadata of content to determine which content most closely aligns with a user's preferences.

SUMMARY

The present disclosure provides systems and methods (collectively referred to herein as a "guidance application") for providing content recommendations to a user when, for example, the user has completed watching a content series such as a television series. In some embodiments, the guidance application provides recommendations to a user that has recently completed binge-watching a content series. It is common for such users to find themselves in a "show hole." In other words, such users typically do not yet know what the next content series that they will consume (e.g., binge-watch) will be. They might search across different providers and platforms for another content series to begin consuming, often relying on cover art, brief descriptions, trailers, and/or watching the first one or more episodes of a series to determine if it is enjoyable.

In some embodiments, the guidance application detects that a user has completed consumption of a content series. For example, the guidance application may detect that the user has completed consumption of all or a portion of a content series within a threshold period of time. The guidance application, in some approaches, may target binge-watchers by defining the threshold appropriately, by determining whether any other one or more suitable criteria have been met, or any combination thereof.

The guidance application also determines one or more behavioral attributes of the user in connection with the consumption of the content series. Any suitable behavioral attributes may be used. For example, behavioral attributes may include any specific temporal attributes associated with the user's consumption of the content series (e.g., time it took to complete a season of the content series, time it took on average to consume individual episodes, number of episodes consumed in a particular time period, any other suitable temporal attributes, or any combination thereof). Behavioral attributes may include information about viewing patterns and other data in connection with the consumption of the content series such as information indicative of or based on the number of episodes continuously viewed (i.e., in a single viewing session).

In some embodiments, after the user has completed consuming a content series or at any suitable point in the course of consuming the content series, such as when sufficient behavioral attributes related to the user's consumption of the content series have been acquired, the guidance application identifies at least one other user that has also completed consumption of the content series and that also had behavioral attributes similar to the user's in connection with the consumption of the content series. Behavioral attributes of the user and of other uses may be stored in, for example, an electronic database at a server.

The guidance application, in some embodiments, determines at least one other content series that was consumed by the identified other users as likely being of interest to the user because of the similar behavioral attributes associated with the current content series. For example, there is a higher likelihood that the user would binge-watch content series identified as having been consumed by the identified other users.

The guidance application may, for example, generate any suitable data from the individual behavioral attributes. For example, data can be aggregated from amongst several users to generate averages, trends, or any other suitable data.

The content series recommendation may be provided to the user in any suitable way. For example, the guidance application causes a listing of content series to be displayed to the user as being suggested content series for the user to consume to get out of the "show hole." In some embodiments, the guidance application displays to the user the data on which the recommendations are based. For example, data (e.g., including numerical values, graphs and charts, or both) may be displayed in the vicinity of each recommendation to provide the user with the data underlying the recommendation. For example, data about the number of other users that have completed the content series that the user has just completed might indicate that a large number of them also viewed another particular content series, that is being recommended. For example, a recommendation can be displayed that corresponds to the content series more often watched by other users that share similar behavioral attributes in connection with the consumption of the current content series the user just completed, with that information also being displayed.

In some embodiments, the guidance application looks at behavioral attributes of the user over more than just the previous content series. For example, all previous content series or a number of previous content series consumed by the user may be analyzed. For example, in some approaches, the guidance application identifies users that have consumed many of the same content series as the instant user and that have similar behavioral attributes to the instant user across at least some of those content series. In some embodiments, the recommendations system may limit its search to only those content series that the user binge-watched in the past.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts through and in which.

DETAILED DESCRIPTION

Figure 1:
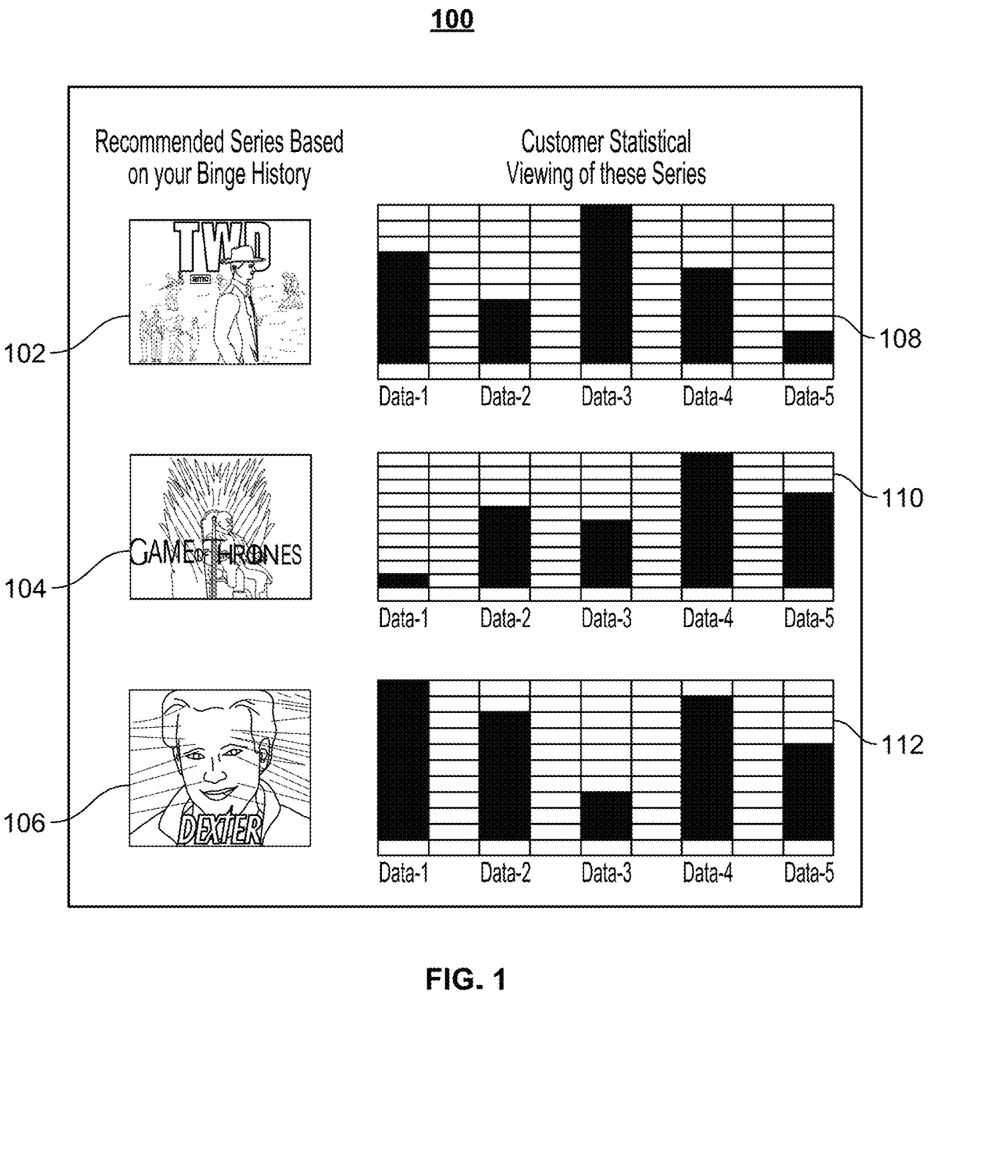
FIG. 1 is an illustrative display screen that provides content series recommendations, in accordance with some embodiments of the present disclosure.

FIG. 1 shows an illustrative display screen 100 that may be provided to a user in response to any suitable trigger for causing recommended content series to be displayed. For example, display screen 100 may be displayed in response to a user command requesting content series recommendations. In some embodiments, display screen 100 may be displayed in response to the user completing binge-watching of a particular content series. In this situation, the guidance application of the present disclosure may determine that, because the user has recently completed consuming a content series in a binge-watching manner (e.g., having consumed a threshold number of episodes of the content series within a threshold period of time), by completing the consumption, the user is in a show hole.

Display screen 100 includes one or more content series recommendations, such as content series recommendations 102, 104, and 106, which correspond to content series that the user has not yet consumed and that the guidance application has determined may be of interest to the user.

As illustrated, content series recommendations 102, 104, and 106 are based on the user's history of binge-watching and on statistics of other users that have consumed each of the respective content series. User viewing statistics 108, 110, and 112 are provided in display 100 to show respective data that the user may interpret to decide relevance of respective content series recommendations 102, 104, and 106.

A user's history of binge-watching may include any suitable number of previously consumed content series that were consumed in a manner falling within the scope of binge-watching. The scope of binge-watching may be based on any suitable parameters but generally requires at least a portion of a content series to have been consumed within a predetermined time period, consumed successively (i.e., one immediately after the other), or both. The guidance application may apply any other suitable criteria in determining whether any particular content series has been binge-watched by any particular user.

User viewing statistics 108, 110, and 112 may each indicate any suitable data in any suitable format indicative of or based on any particular one or more behavioral attributes in connection with the consumption of the corresponding recommended content series. Behavioral attributes may include any usage data of one or more devices or applications related to the consumption of a particular content series. This may include information about switching between particular content items while consuming the content series, whether certain scenes or episodes of the content series were rewatched, any temporal information related to the consumption of the content series (e.g., times when episodes were viewed, time periods spent watching episodes or seasons or both, number of episodes continuously watched in any one or more viewing sessions, any other temporal information, or any combination thereof), any supplemental information accessed during or not during the time of consumption, any other suitable usage information, or any combination thereof.

As illustrated, several data items labeled Data1 through Data5 for each recommended content series are displayed in display screen 100. The data items may be provided in numerical form or as graphical representations, such as graphs. Each data item is derived from behavioral attributes of one or more of the users that have consumed (e.g., via binge-watching) the corresponding content series. As an example, a data item may be the total number or percentage of users that have consumed the corresponding content series that had also consumed the content series that the instant user has most recently consumed. It will be understood that consumption of a content series may be limited to those instances where the consumption was by way of binge-watching.

In some embodiments, the guidance application may provide the user with the ability to select or otherwise define the particular behavioral attributes, data items, or both to be used in generating content series recommendations; to be displayed in an interface such as display screen 100; or both.

Figure 2:
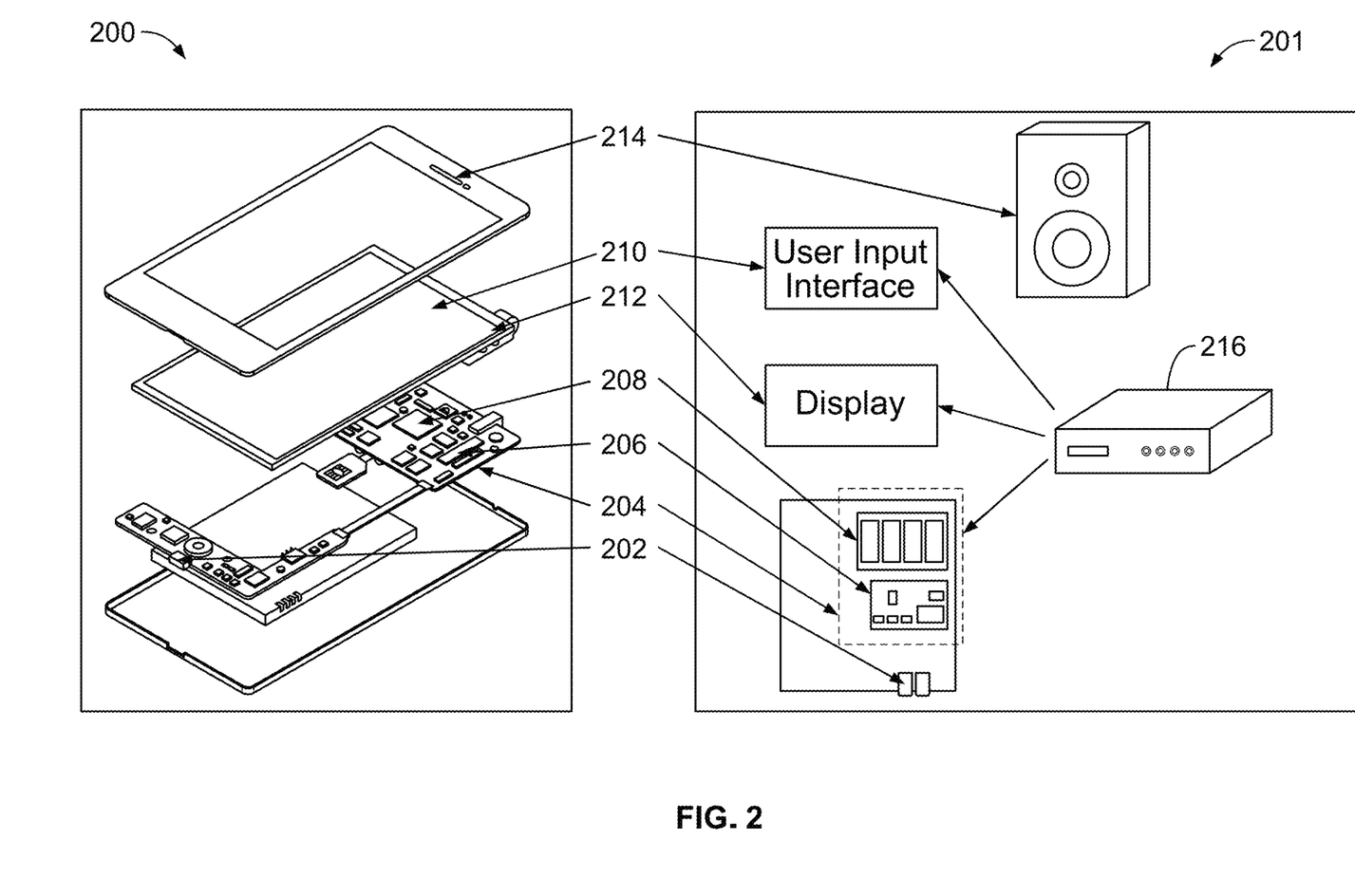
FIG. 2 is a block diagram of an illustrative user equipment device, in accordance with some embodiments of the disclosure.

Users may access content and the guidance application from one or more of their user equipment devices or through any other suitable user equipment system. FIG. 2 shows generalized embodiments of an illustrative user equipment device. For example, the user equipment device may be a smartphone device or a remote control. In another example, the user equipment system may be a user television equipment system. A user television equipment system may include a set-top box 216. Set-top box 216 may be communicatively connected to speakers 214 and display 212. In some embodiments, display 212 may be a television display or a computer display. In some embodiments, set top box 216 may be communicatively connected to user interface input 210. In some embodiments, user interface input 210 may be a remote control device. Set-top box 216 may include one or more circuit boards. In some embodiments, the circuit boards may include processing circuitry, control circuitry, and storage (e.g., RAM, ROM, hard disk, removable disk, etc.). In some embodiments, circuit boards may include an input/output path. More specific implementations of user equipment devices are discussed below in connection with FIG. 3. Each one of user equipment device 200 and user equipment system 201 may receive content and data via input/output (hereinafter "I/O") path 202. I/O path 202 may provide content (e.g., broadcast programming, on-demand programming, Internet content, content available over a local area network (LAN) or wide area network (WAN), and/or other content) and data to control circuitry 204, which includes processing circuitry 206 and storage 208. Control circuitry 204 may be used to send and receive commands, requests, and other suitable data using I/O path 202. I/O path 202 may connect control circuitry 204 (and specifically processing circuitry 206) to one or more communications paths (described below). I/O functions may be provided by one or more of these communications paths but are shown as a single path in FIG. 2 to avoid overcomplicating the drawing.

Control circuitry 204 may be based on any suitable processing circuitry such as processing circuitry 206. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 204 executes instructions for an application stored in memory (e.g., storage 208). Specifically, control circuitry 204 may be instructed by the guidance application to perform the functions discussed above and below. For example, the guidance application may provide instructions to control circuitry 204 to generate the media guidance displays. In some implementations, any action performed by control circuitry 204 may be based on instructions received from the guidance application.

In client/server-based embodiments, control circuitry 204 may include communications circuitry suitable for communicating with a guidance application server or other networks or servers. The instructions for carrying out the above-mentioned functionality may be stored on the guidance application server. Communications circuitry may include a cable modem, an integrated services digital network (ISDN) modem, a digital subscriber line (DSL) modem, a telephone modem, Ethernet card, a wireless modem for communications with other equipment, or any other suitable communications circuitry. Such communications may involve the Internet or any other suitable communications networks or paths (described in more detail in connection with FIG. 3). In addition, communications circuitry may include circuitry that enables peer-to-peer communication of user equipment devices, or communication of user equipment devices in locations remote from each other (described in more detail below).

Memory may be an electronic storage device provided as storage 208 that is part of control circuitry 204. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Storage 208 may be used to store various types of content described herein as well as media guidance data described above. Nonvolatile memory may also be used (e.g., to launch a boot-up routine and other instructions). Cloud-based storage, described in relation to FIG. 3, may be used to supplement storage 208 or instead of storage 208.

Control circuitry 204 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 204 may also include scaler circuitry for upconverting and downconverting content into the preferred output format of the user equipment 201. Control circuitry 204 may also include digital-to-analog converter circuitry and analog-to-digital converter circuitry for converting between digital and analog signals. The tuning and encoding circuitry may be used by the user equipment device to receive and display, play, or record content. The tuning and encoding circuitry may also be used to receive guidance data. The circuitry described herein, including, for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 208 is provided as a separate device from user equipment 201, the tuning and encoding circuitry (including multiple tuners) may be associated with storage 208.

A user may send instructions to control circuitry 204 using user input interface 210. User input interface 210 may be any suitable user interface, such as a remote control, mouse, trackball, keypad, keyboard, touchscreen, touchpad, stylus input, joystick, voice recognition interface, or other user input interfaces. Display 212 may be provided as a stand-alone device or integrated with other elements of each one of user equipment device 200 and user equipment system 201. For example, display 212 may be a touchscreen or touch-sensitive display. In such circumstances, user input interface 210 may be integrated with or combined with display 212. Display 212 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 212 may be HDTV-capable. In some embodiments, display 212 may be a 3D display, and the interactive application and any suitable content may be displayed in 3D. A video card or graphics card may generate the output to the display 212. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 204. The video card may be integrated with the control circuitry 204. Speakers 214 may be provided as integrated with other elements of each one of user equipment device 200 and user equipment system 201 or may be stand-alone units. The audio component of videos and other content displayed on display 212 may be played through speakers 214. In some embodiments, the audio may be distributed to a receiver (not shown), which processes and outputs the audio via speakers 214.

The guidance application may be implemented using any suitable architecture. For example, it may be a stand-alone application wholly implemented on each one of user equipment device 200 and user equipment system 201. In such an approach, instructions of the guidance application are stored locally (e.g., in storage 208), and data for use by the guidance application is downloaded on a periodic basis (e.g., from an out-of-band feed, from an Internet resource, or using another suitable approach). Control circuitry 204 may retrieve instructions of the guidance application from storage 208 and process the instructions to generate any of the displays discussed herein. Based on the processed instructions, control circuitry 204 may determine what action to perform when input is received from user input interface 210. For example, movement of a cursor on a display up/down may be indicated by the processed instructions when user input interface 210 indicates that an up/down button was selected.

In some embodiments, the guidance application is a client/server-based application. Data for use by a thick or thin client implemented on each one of user equipment device 200 and user equipment system 201 is retrieved on demand by issuing requests to a server remote from each one of user equipment device 200 and user equipment system 201. In one example of a client-server based guidance application, control circuitry 204 runs a web browser that interprets web pages provided by a remote server. For example, the remote server may store the instructions for the guidance application in a storage device. The remote server may process the stored instructions using circuitry (e.g., control circuitry 204) and generate the displays discussed above and below. The client device may receive the displays generated by the remote server and may display the content of the displays locally on equipment device 200. This way, the processing of the instructions is performed remotely by the server while the resulting displays are provided locally on equipment device 200. Equipment device 200 may receive inputs from the user via user input interface 210 and transmit those inputs to the remote server for processing and generating the corresponding displays. For example, equipment device 200 may transmit a communication to the remote server indicating that an up/down button was selected via user input interface 210. The remote server may process instructions in accordance with that input and generate a display of the guidance application corresponding to the input (e.g., a display that moves a cursor up/down). The generated display is then transmitted to equipment device 200 for presentation to the user.

In some embodiments, the guidance application is downloaded and interpreted or otherwise run by an interpreter or virtual machine (run by control circuitry 204). In some embodiments, the guidance application may be encoded in the ETV Binary Interchange Format (EBIF), received by control circuitry 204 as part of a suitable feed, and interpreted by a user agent running on control circuitry 204. For example, the guidance application may be an EBIF application. In some embodiments, the guidance application may be defined by a series of JAVA-based files that are received and run by a local virtual machine or other suitable middleware executed by control circuitry 204. In some of such embodiments (e.g., those employing MPEG-2 or other digital media encoding schemes), the guidance application may be, for example, encoded and transmitted in an MPEG-2 object carousel with the MPEG audio and video packets of a program.

Figure 3:
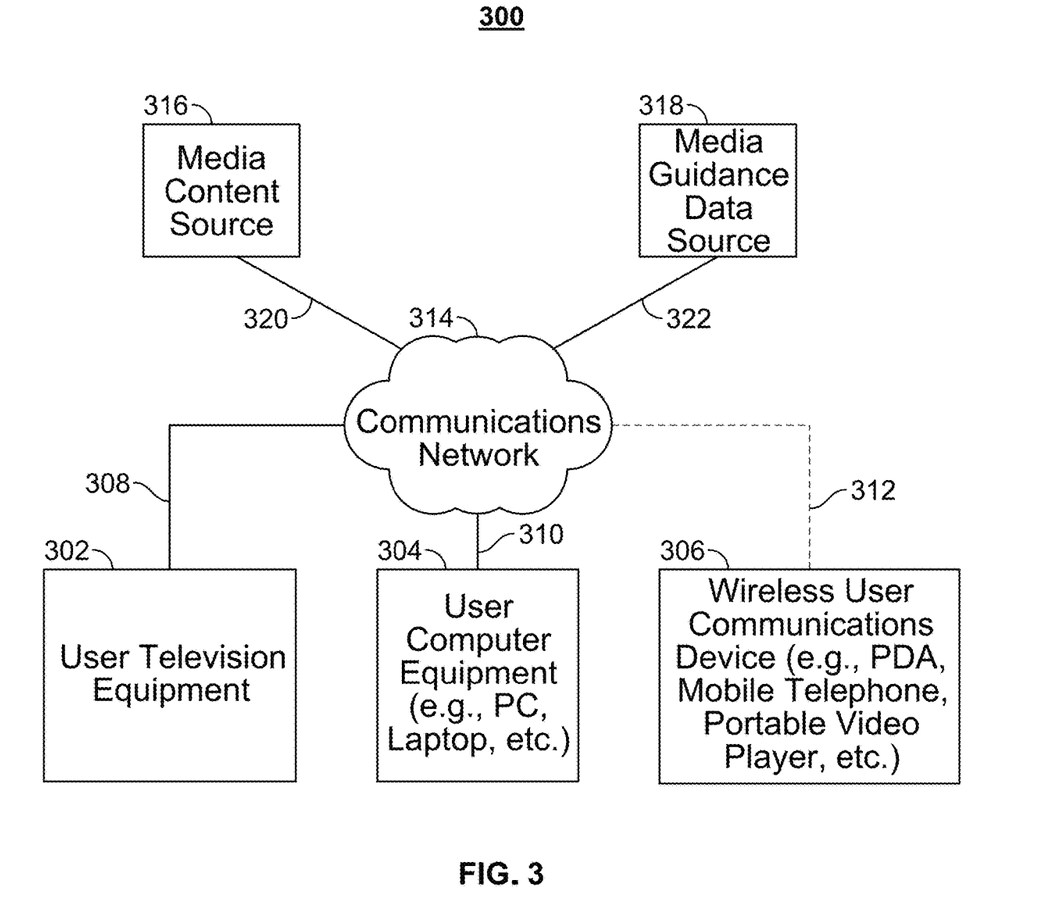
FIG. 3 is a block diagram of an illustrative media system, in accordance with some embodiments of the disclosure.

Each one of user equipment device 200 and user equipment system 201 of FIG. 2 can be implemented in system 300 of FIG. 3 as user television equipment 302, user computer equipment 304, wireless user communications device 306, or any other type of user equipment suitable for accessing content, such as a non-portable gaming machine. For simplicity, these devices may be referred to herein collectively as user equipment or user equipment devices and may be substantially similar to user equipment devices described above. User equipment devices, on which an application may be implemented, may function as stand-alone devices or may be part of a network of devices. Various network configurations of devices may be implemented and are discussed in more detail below.

A user equipment device utilizing at least some of the system features described above in connection with FIG. 2 need not be classified solely as user television equipment 302, user computer equipment 304, or a wireless user communications device 306. For example, user television equipment 302 may, like some user computer equipment 304, be Internet-enabled, allowing for access to Internet content, while user computer equipment 304 may, like some television equipment 302, include a tuner allowing for access to television programming. The guidance application may have the same layout on various different types of user equipment or may be tailored to the display capabilities of the user equipment. For example, on user computer equipment 304, the guidance application may be provided as a website accessed by a web browser. In another example, the guidance application may be scaled down for wireless user communications devices 306.

In system 300, there is typically more than one of each type of user equipment device, but only one of each is shown in FIG. 3 to avoid overcomplicating the drawing. In addition, each user may utilize more than one type of user equipment device and also more than one of each type of user equipment device.

In some embodiments, a user equipment device (e.g., user television equipment 302, user computer equipment 304, wireless user communications device 306) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the website www-.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 314. Namely, user television equipment 302, user computer equipment 304, and wireless user communications device 306 are coupled to communications network 314 via communications paths 308, 310, and 312, respectively. Communications network 314 may be one or more networks including the Internet, a mobile phone network, mobile voice or data network (e.g., a 4G or LTE network), cable network, public switched telephone network, or other types of communications network or combinations of communications networks. Paths 308, 310, and 312 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Path 312 is drawn with dotted lines to indicate that in the exemplary embodiment shown in FIG. 3 it is a wireless path, and paths 308 and 310 are drawn as solid lines to indicate they are wired paths (although these paths may be wireless paths, if desired). Communications with the user equipment devices may be provided by one or more of these communications paths but are shown as a single path in FIG. 3 to avoid overcomplicating the drawing.

Although communications paths are not drawn between user equipment devices, these devices may communicate directly with each other via communications paths, such as those described above in connection with paths 308, 310, and 312, as well as other short-range point-to-point communications paths, such as USB cables, IEEE 1394 cables, wireless paths (e.g., Bluetooth, infrared, IEEE 302-11x, etc.), or other short-range communication via wired or wireless paths. BLUETOOTH is a certification mark owned by Bluetooth SIG, INC. The user equipment devices may also communicate with each other directly through an indirect path via communications network 314.

System 300 includes media content source 316 and media guidance data source 318 coupled to communications network 314 via communications paths 320 and 322, respectively. Paths 320 and 322 may include any of the communications paths described above in connection with paths 308, 310, and 312. Communications with the content source 316 and media guidance data source 318 may be exchanged over one or more communications paths but are shown as a single path in FIG. 3 to avoid overcomplicating the drawing. In addition, there may be more than one of each of content source 316 and media guidance data source 318, but only one of each is shown in FIG. 3 to avoid overcomplicating the drawing. (The different types of each of these sources are discussed below.) If desired, content source 316 and media guidance data source 318 may be integrated as one source device. Although communications between sources 316 and 318 with user equipment devices 302, 304, and 306 are shown as through communications network 314, in some embodiments, sources 316 and 318 may communicate directly with user equipment devices 302, 304, and 306 via communications paths (not shown) such as those described above in connection with paths 308, 310, and 312.

Content source 316 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 316 may be the originator of content (e.g., a television broadcaster, a webcast provider, etc.) or may not be the originator of content (e.g., an on-demand content provider, an Internet provider of content of broadcast programs for downloading, etc.). Content source 316 may include cable sources, satellite providers, on-demand providers, Internet providers, over-the-top content providers, or other providers of content. Content source 316 may also include a remote media server used to store different types of content (including video content selected by a user), in a location remote from any of the user equipment devices. Systems and methods for remote storage of content and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 318 may provide media guidance data such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 318 may be provided to users' equipment using a client/server approach. For example, a user equipment device may pull media guidance data from a server, or a server may push media guidance data to a user equipment device. In some embodiments, a guidance application client residing on the user's equipment may initiate sessions with source 318 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 318 may provide user equipment devices 302, 304, and 306 the guidance application itself or software updates for the guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). Viewer data may also include behavioral attributes as used in accordance with the present disclosure. The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the guidance application may generate promotions that entice the user to keep the particular service or source indicated by the score as one to which the user will likely terminate access.

Applications may be, for example, stand-alone applications implemented on user equipment devices. For example, the guidance application may be implemented as software or a set of executable instructions that may be stored in storage 208 and executed by control circuitry 204 of each one of user equipment device 200 and user equipment system 201.

In some embodiments, applications may be client/server applications where only a client application resides on the user equipment device, and the server application resides on a remote server. For example, applications may be implemented partially as a client application on control circuitry 204 of each one of user equipment device 200 and user equipment system 201 and partially on a remote server as a server application (e.g., media guidance data source 318) running on control circuitry of the remote server. When executed by control circuitry of the remote server (such as media guidance data source 318), the guidance application may instruct the control circuitry to generate the guidance application displays and transmit the generated displays to the user equipment device. The server application may instruct the control circuitry of the media guidance data source 318 to transmit data for storage on the user equipment. The client application may instruct control circuitry of the receiving user equipment to generate the guidance application displays.

Content and/or media guidance data delivered to user equipment devices 302, 304, and 306 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may transfer only IP packets provided by the OTT content provider. Examples of OTT content providers include YOUTUBE, NETFLIX, and HULU, which provide audio and video via IP packets. YouTube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute applications (e.g., web-based applications or cloud-based applications), or the content can be displayed by applications stored on the user equipment device.

Media guidance system 300 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 3.

In one approach, user equipment devices may communicate with each other within a home network. User equipment devices can communicate with each other directly via short-range point-to-point communication schemes described above, via indirect paths through a hub or other similar device provided on a home network, or via communications network 314. Each of the multiple individuals in a single home may operate different user equipment devices on the home network. As a result, it may be desirable for various media guidance information or settings to be communicated between the different user equipment devices. For example, it may be desirable for users to maintain consistent application settings on different user equipment devices within a home network, as described in greater detail in Ellis et al., U.S. Patent Publication No. 2005/0251827, filed Jul. 11, 2005, which is hereby incorporated by reference herein in its entirety. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via an application implemented on a remote device. For example, users may access an online application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with an application on the user's in-home equipment. Various systems and methods for user equipment devices communicating, where the user equipment devices are in locations remote from each other, are discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their application to communicate directly with content source 316 to access content. Specifically, within a home, users of user television equipment 302 and user computer equipment 304 may access the guidance application to navigate among and locate desirable content. Users may also access the guidance application outside of the home using wireless user communications devices 306 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 314. These cloud resources may include one or more content sources 316 and one or more media guidance data sources 318. In addition or in the alternative, the remote computing sites may include other user equipment devices, such as user television equipment 302, user computer equipment 304, and wireless user communications device 306. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally stored content.

A user may use various content capture devices, such as camcorders, digital cameras with video mode, audio recorders, mobile phones, and handheld computing devices, to record content. The user can upload content to a content storage service on the cloud directly, for example, from user computer equipment 304 or wireless user communications device 306 having content capture feature. Alternatively, the user can first transfer the content to a user equipment device, such as user computer equipment 304. The user equipment device storing the content uploads the content to the cloud using a data transmission service on communications network 314. In some embodiments, the user equipment device itself is a cloud resource, and other user equipment devices can access the content directly from the user equipment device on which the user stored the content.

Cloud resources may be accessed by a user equipment device using, for example, a web browser, an application, a desktop application, a mobile application, and/or any combination of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

Figure 4:
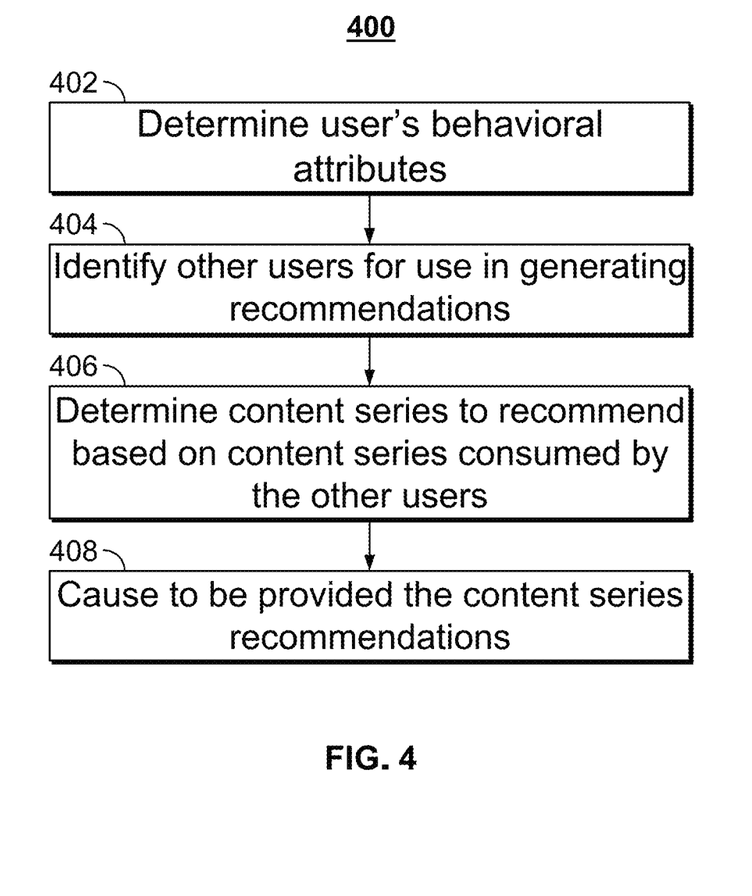
FIG. 4 is a flowchart of illustrative steps for providing content series recommendations, in accordance with some embodiments of the present disclosure.

FIG. 4 shows a flowchart representing an illustrative process 400 for providing content series recommendations, in accordance with some embodiments of the present disclosure. At step 402, the guidance application determines a user's behavioral attributes in connection with that user's consumption of one or more content series. For example, the guidance application may collect usage data during the course of the user's consumption of a content series. The usage data may represent certain behavioral attributes, may be used to generate behavioral attributes, or both. Usage data may also be used to determine whether the user binge-watched at least a portion of a content series. In some embodiments, when the user completes consumption of a content series, such as through binge-watching, the guidance application will generate (if needed) and store the behavioral attributes associated with the user's consumption of that content series.

At step 404, the guidance application identifies other users that meet certain criteria to use in generating recommendations. For example, the guidance application identifies other users that have consumed at least one content series in common with the instant user. In some embodiments, the guidance application may identify those users that have consumed at least the last content series that has been consumed by the user. In some embodiments, the guidance application identifies other users that share at a least a threshold level of similarity in behavioral attributes in connection with their respective consumption of the last one or more content series consumed by the user relative to the user. For example, the guidance application may identify other users that have also binge-watched the last content series that the user binge-watched and that also share at least a certain percentage of a predefined number of behavioral attributes in connection with the consumption of this content series with the user. Behavioral attributes may include any suitable usage data or information derived from usage data such as, for example, information corresponding to a number of episodes continuously watched in at least one consumption session, information about how long it took a user to complete consumption of a season of the content series, any other suitable information, or any combination thereof.

At step 406, the guidance application determines one or more content series to recommend to the user based on the content series consumed by the other users. For example, because the other users that were identified in step 404 also consumed the last content series in a manner similar to that of the user, it is probable that other content series those other users consumed would also be of interest to the user. Therefore, the guidance application may identify previously consumed content series of the users other than the one or more content series consumed by the instant user to recommend to the instant user. In some embodiments, the guidance application identifies a certain number or maximum number of recommendations to display based on how many of the other users consumed each respective content series. The same criteria may also be used to sort the recommendations when provided as an ordered listing. For example, the guidance application may choose the top three most commonly consumed content series and cause them to be displayed in order of popularity. In some embodiments, the order or any other indicia of priority may be based, at least in part, on a service provider. For example, a provider or sponsor of the guidance application may cause the guidance application to promote certain recommended content series over others. For example, Netflix-generated content series that are determined by the guidance application to be recommended content series would be displayed at the top of the list of the recommended content series being displayed when Netflix is the service provider or a sponsor of the guidance application.

At step 408, the guidance application causes to be provided the content series recommendations. For example, a display screen formatted and arranged such as display screen 100 of FIG. 1 may be caused to be provided. In some embodiments, a listing of content series recommendations may be provided without associated usage data or behavior attribute information being provided.

Figure 5:
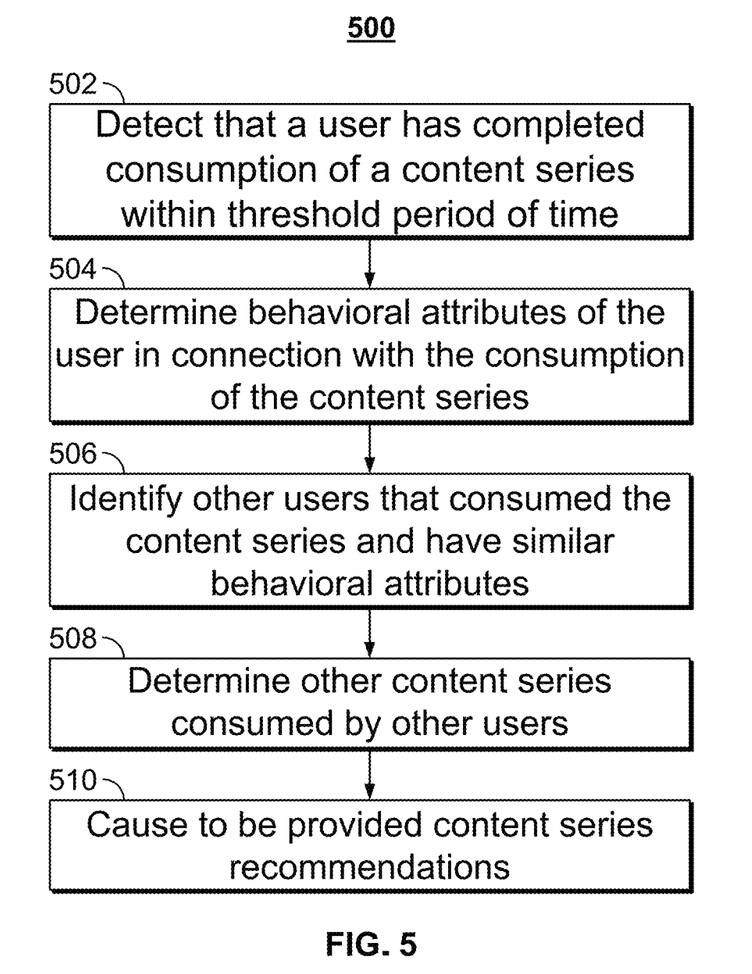
FIG. 5 is another flowchart of illustrative steps for providing content series recommendations, in accordance with some embodiments of the present disclosure.

FIG. 5 is another flowchart representing a second illustrative process 500 for providing content series recommendations, in accordance with some embodiments of the present disclosure. At step 502, the guidance application detects that a user has completed consumption of a content series within a threshold period of time. For example, the threshold period of time may represent a threshold under which the guidance application considers the consumption to have been in the form of binge-watching. In some embodiments, any other suitable criteria may be used to determine that the user consumed the content series in the form of binge-watching. As a result of the user having consumed the content series within a threshold period of time, the user may be in a "show hole," and providing recommendations for other content series may be appropriate for the user to continue consuming.

At step 504, the guidance application determines behavioral attributes of the user in connection with the user's consumption of the content series referenced in step 502. This may be accomplished using methods described above in connection with FIG. 4.

At step 506, the guidance application identifies other users that consumed the content series referenced in step 502 and that also have similar behavioral attributes in connection with the consumption of the content series as the instant user. The identified users may be required to have also consumed the content series within the threshold period of time.

At step 508, the guidance application determines other content series consumed by the other users identified in step 506. In some embodiments, the other content series may include only those content series that were consumed within a threshold period of time, or otherwise determined to have been binge-watched.

At step 510, the guidance application causes to be provided the content series recommendations. The recommendations may be, for example, at least a subset of the content series identified at step 508. For example, in some embodiments, the guidance application recommends the top certain number of content series that have been consumed by the greatest number of the other users.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A computer-implemented method for providing a new content series recommendation, the method comprising:
   detecting that a user has completed consumption of a first content series within a threshold period of time, wherein the first content series comprises one or more seasons, each season including a plurality of episodes of the first content series;
   determining, using processing circuitry, one or more behavioral attributes related to preferences of the user in connection with the consumption of the first content series, wherein the one or more behavioral attributes related to the preferences of the user comprises how long it took the user to complete consumption of at least one season of the first content series and how often the user switched between different content items while consuming the content series;
   when the user has completed the consumption of the first content series, identifying, using the processing circuitry, at least one other user that has completed consumption of the first content series based on a comparison of respective behavioral attributes related to the preferences of the user and of the at least one other user, wherein the at least one other user shares at least one behavioral attribute, related to the preferences of the user, with the user, and wherein behavioral attributes, related to the preferences of the user, of the at least one other user are accessed from an electronic database;
   analyzing a plurality of viewing data derived from the respective behavioral attributes, related to the preferences of the user, of the at least one other user;
   identifying, using the processing circuitry, a second content series consumed by the at least one other user that does not include any episodes included in the one or more seasons that comprise the first content series, wherein the second content series was consumed by the at least one other user within a second threshold period of time; and
   causing to be provided the new content series recommendation based on the second content series consumed by the at least one other user, wherein the causing to be provided the new content series recommendation comprises generating for display (a) an indication of at least one other content series, and (b) the plurality of viewing data derived from the respective behavioral attributes, related to the preferences of the user, of the at least one other user and associated with the at least one other content series, and wherein the plurality of viewing data is generated as numerical values based on the comparison of the respective behavioral attributes related to the preferences of the user.

2. The method of claim 1, wherein the at least one other user comprises a plurality of other users and wherein determining the at least one content series consumed by the at least one other user comprises determining the at least one other content series consumed by a largest number of the plurality of other users.

3. The method of claim 1, wherein detecting that the user has completed consumption of the content series within the threshold period of time comprises determining that the user has binge-watched at least a portion of the content series.

4. The method of claim 1, wherein determining one or more behavioral attributes related to the preferences of the user comprises determining information corresponding to a number of episodes continuously watched in at least one consumption session.

5. The method of claim 1, wherein the content series is separated into at least two seasons, and wherein determining one or more behavioral attributes related to the preferences of the user comprises determining how long it took the user to complete consumption of at least one of the at least two seasons.

6. A system for providing a new content series recommendation, the system comprising:
   an electronic database; and
   processing circuitry configured to:
   detect that a user has completed consumption of a first content series within a threshold period of time, wherein the first content series comprises one or more seasons, each season including a plurality of episodes of the first content series;
   determine one or more behavioral attributes related to preferences of the user in connection with the consumption of the first content series, wherein the one or more behavior attributes related to the preferences of the user comprises how long it took the user to complete consumption of at least one season of the first content series and how often the user switched between different content items while consuming the content series;
   when the user has completed the consumption of the first content series, identify at least one other user that has completed consumption of the first content series based on a comparison of respective behavioral attributes related to the preferences of the user and of the at least one other user, wherein the at least one other user shares at least one behavioral attribute, related to the preferences of the user, with the user, and wherein behavioral attributes, related to the preferences of the user, of the at least one other user are accessed from the electronic database;

analyze a plurality of viewing data derived from the respective behavioral attributes, related to the preferences of the user, of the at least one other user;

identify a second content series consumed by the at least one other user that does not include any episodes included in the one or more seasons that comprise the first content series, wherein the second content series was consumed by the at least one other user within a second threshold period of time, and cause to be provided the new content series recommendation based on the second content series consumed by the at least one other user, wherein causing to be provided the new content series recommendation comprises generating for display (a) an indication of at least one other content series, and (b) the plurality of viewing data derived from the respective behavioral attributes, related to the preferences of the user, of the at least one other user and associated with the at least one other content series, and wherein the plurality of viewing data is generated as numerical values based on the comparison of the respective behavioral attributes related to the preferences of the user.

7. The system of claim 6, wherein the at least one other user comprises a plurality of other users and wherein the processing circuitry is further configured to determine the at least one other content series consumed by a largest number of the plurality of other users.

8. The system of claim 6, wherein the processing circuitry is further configured to determine that the user has binge-watched at least a portion of the content series.

9. The system of claim 6, wherein the processing circuitry is further configured to determine information corresponding to a number of episodes continuously watched in at least one consumption session.

10. The system of claim 6, wherein the content series is separated into at least two seasons, and wherein the processing circuitry is further configured to determine how long it took the user to complete consumption of at least one of the at least two seasons.

11. A non-transitory computer-readable medium on which are stored computer instructions that, when executed, cause to be performed a method for providing a new content series recommendation, the method comprising:

detecting that a user has completed consumption of a first content series within a threshold period of time, wherein the first content series comprises one or more seasons, each season including a plurality of episodes of the first content series;

determining, using processing circuitry, one or more behavioral attributes related to preferences of the user in connection with the consumption of the first content series, wherein the one or more behavior attributes related to the preferences of the user comprises how long it took the user to complete consumption of at least one season of the first content series and how often the user switched between different content items while consuming the content series;

when the user has completed the consumption of the first content series, identifying, using the processing circuitry, at least one other user that has completed consumption of the first content series based on a comparison of respective behavioral attributes related to the preferences of the user and of the at least one other user, wherein the at least one other user shares at least one behavioral attribute, related to the preferences of the user, with the user, and wherein behavioral attributes, related to the preferences of the user, of the at least one other user are accessed from an electronic database;

analyzing a plurality of viewing data derived from the respective behavioral attributes, related to the preferences of the user, of the at least one other user;

identifying, using the processing circuitry, a second content series consumed by the at least one other user that does not include any episodes included in the one or more seasons that comprise the first content series, wherein the second content series was consumed by the at least one other user within a second threshold period of time; and causing to be provided the new content series recommendation based on the second content series consumed by the at least one other user, wherein the causing to be provided the new content series recommendation comprises generating for display (a) an indication of at least one other content series, and (b) the plurality of viewing data derived from the respective behavioral attributes, related to the preferences of the user, of the at least one other user and associated with the at least one other content series, and wherein the plurality of viewing data is generated as numerical values based on the comparison of the respective behavioral attributes related to the preferences of the user.

12. The non-transitory computer-readable medium of claim 11, wherein the at least one other user comprises a plurality of other users and wherein determining the at least one other content series consumed by the at least one other user comprises determining the at least one other content series consumed by a largest number of the plurality of other users.

13. The non-transitory computer-readable medium of claim 11, wherein detecting that the user has completed consumption of the content series within the threshold period of time comprises determining that the user has binge-watched at least a portion of the content series.

14. The non-transitory computer-readable medium of claim 11, wherein determining one or more behavioral attributes related to the preferences of the user comprises determining information corresponding to a number of episodes continuously watched in at least one consumption session.

15. The non-transitory computer-readable medium of claim 11, wherein the content series is separated into at least two seasons, and wherein determining one or more behavioral attributes related to the preferences of the user comprises determining how long it took the user to complete consumption of at least one of the at least two seasons.

* * * * *